(12) United States Patent
Chida et al.

(10) Patent No.: US 7,701,159 B2
(45) Date of Patent: Apr. 20, 2010

(54) BRUSHLESS MOTOR SYSTEM

(75) Inventors: Tadahiko Chida, Hitachi (JP); Akira Mishima, Mito (JP); Nobuyasu Kanekawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 338 days.

(21) Appl. No.: 11/411,957

(22) Filed: Apr. 27, 2006

(65) Prior Publication Data

US 2006/0244401 A1 Nov. 2, 2006

(30) Foreign Application Priority Data

Apr. 28, 2005 (JP) ............................. 2005-130708

(51) Int. Cl.
*H02P 6/00* (2006.01)
(52) U.S. Cl. .................... 318/400.01; 318/432
(58) Field of Classification Search ............ 318/400.01, 318/139, 432, 434
See application file for complete search history.

(56) References Cited

U.S. PATENT DOCUMENTS 5,475,290 A * 12/1995 Tani et al. ............... 318/434

| 5,838,877 A | 11/1998 | Elliot et al. |
| 2004/0207463 A1 | 10/2004 | Pelly |

FOREIGN PATENT DOCUMENTS

| JP | 05-022985 A | 1/1993 |
| JP | 07-184301 A | 7/1995 |
| JP | 08-047244 A | 2/1996 |
| JP | 8-98328 A | 4/1996 |
| JP | 2001-204136 A | 7/2001 |
| JP | 3 393 374 B2 | 1/2003 |

OTHER PUBLICATIONS traslation of Japanese patent JP 08-098328, pp. 1-10 Jul. 3, 2008.*

* cited by examiner

*Primary Examiner*—Rina I Duda
(74) *Attorney, Agent, or Firm*—Crowell & Moring LLP

(57) ABSTRACT

A brushless motor system which can suppress adverse influences of electromagnetic noise without increasing the size and enhancing the performance of a filter circuit. In a brushless motor system comprising a brushless motor, an inverter, and a direct current power source, a noise return line for returning a noise current is connected between the brushless motor and the inverter. The noise current is generated in the inverter and reaches the brushless motor. With the provision of the noise return line, a common mode current leaking from the brushless motor to a ground can be reduced.

37 Claims, 8 Drawing Sheets

WITHOUT NOISE RETURN LINE

WITH NOISE RETURN LINE
(0.5-SQUARE LEAD WIRE × 3)

BRUSHLESS MOTOR SYSTEM

BACKGROUND OF THE INVENTION

1. Field of the Invention

The present invention relates to a brushless motor system driven by using a direct current (DC) power source, and more particularly to a brushless motor system designed to be capable of considering a counterplan to electromagnetic noise.

2. Description of the Related Art

A brushless motor having neither a brush nor a commutator is free from wear because of including no mechanical contacts. Therefore, the brushless motor has advantages, such as low noise, high-speed rotation and long life, and is becoming increasingly prevalent. In the brushless motor, a rotating magnetic field is generated by controlling a current flowing through each wire (motor winding) wound over a stator, and a mechanical rotatory power is given to a rotor by the produced rotating magnetic field. An inverter is required to control the current flowing through the motor winding. Accordingly, it can be said that there are three basic components for a brushless motor system, i.e., the power source, the brushless motor, and the inverter.

A brushless motor loaded on a vehicle requires to be controlled with high accuracy. For that reason, PWM (Pulse Width Modulation) control using an inverter is performed in many cases. In the PWM control, high-speed switching is repeated by semiconductor switching devices in the inverter. The repeated high-speed switching causes abrupt potential variations in the motor winding. Because of the presence of stray capacitance between the motor winding and a metal housing of the motor, electric charges are repeatedly charged to and discharged from the stray capacitance with the repeated switching by the semiconductor switching devices.

Usually, because the metal housing of the motor is directly contacted with or indirectly connected to a ground, currents charged to and discharged from the stray capacitance with the repeated switching in the PWM control are generated. As a result, those charge and discharge currents are leaked as noise currents to the ground. The noise currents leaking to the ground flow in common to all the motor windings and therefore are called a common mode current. The common mode current is a main factor of electromagnetic noise.

FIG. 2 is a reference view showing main paths along which the common mode current flows in a vehicle-loaded brushless motor system driven by a DC power source, for example, when no measures are taken against noise. The common mode current starts to flow from an inverter 200 and is leaked to a ground 108 through stray capacitance 201 existing between each motor winding 104 and a metal housing 105 of the motor. The leaked common mode current is returned to the inverter 200 through a ground line and a power source line of the inverter 200, thereby forming loops 202 and 203 shown in FIG. 2.

The common mode current not only flows, as conduction noise, into the system itself, peripheral devices and so on, but also generates radiation noise while flowing along the large loops shown in FIG. 2. In other words, the common mode current is a main factor causing the conduction noise and the radiation noise, thus giving rise to adverse influences such as radio noise and malfunction.

Generally, a filter circuit is disposed in the inverter to reduce the electromagnetic noise. For example, Patent Document 1 (JP-A-8-47244) discloses a system in which a filter circuit is disposed in each of the power source side and the motor side of an inverter circuit.

Switching at a higher speed in the PWM control has been recently proposed with intent to increase the speed and accuracy in control of the brushless motor, as well as to reduce a switching loss in the inverter for realizing higher efficiency. Steeper changes of voltage and current caused by the higher-speed switching increases a noise current. Also, a larger current flowing through the inverter with a higher output of the motor increases the noise current. Thus, adverse influences of electromagnetic noise upon the brushless motor system itself and the peripheral devices become more serious.

SUMMARY OF THE INVENTION

In the known brushless motor system, as described above, the generation of the electromagnetic noise is suppressed by using a filter circuit. However, the countermeasure against the noise by using the filter circuit is disadvantageous in that the filter circuit has to be increased in size and enhanced in performance when the noise current is increased with higher speed of the switching and an increase of an output current in the inverter. The increased size and the enhanced performance of the filter circuit push up the cost and result in a larger size of the inverter itself.

An object of the present invention is to provide a brushless motor system which can suppress adverse influences of the electromagnetic noise without increasing the size and enhancing the performance of a filter circuit.

To achieve the above object, a brushless motor system according to a main aspect of the present invention comprises a brushless motor having motor windings inside a first metal housing (metal housing of the motor); an inverter including an inverter circuit inside a second metal housing (metal housing of the inverter) and driving the brushless motor through three motor power lines connected to the motor windings; and a direct current power source for supplying electric power to the inverter circuit, wherein the inverter has a first wiring (P wiring) for supplying the electric power from the direct current power source to the inverter circuit and a second wiring (N wiring) electrically connected to a ground, the direct current power source has a first terminal (positive terminal) electrically connected to the first wiring (P wiring) and a second terminal (negative terminal) electrically connected to the ground, and a noise return line for returning a noise current is connected between the brushless motor and the inverter.

Preferably, the brushless motor system includes a plurality of noise return lines, and the plurality of noise return line are electrically connected between the brushless motor and the inverter. Further, the plurality of noise return lines are bundled together with the three motor power lines. The three motor power lines are arranged such that each motor power line is adjacent to the other two motor power lines while being insulated from one another, and the plurality of noise return lines are each contacted with two of the three motor power lines.

Preferably, the inverter has a filter circuit including a passive device in an input section of the inverter. Further, the inverter has a control board for controlling the inverter circuit, and the control board is connected with power source lead-out lines.

According to the present invention, it is possible to provide a low-cost and small-sized brushless motor system capable of suppressing the generation of the electromagnetic noise.

DESCRIPTION OF THE PREFERRED EMBODIMENTS

Embodiments of the present invention will be described in detail below with reference to the drawings.

First Embodiment

Figure 1:
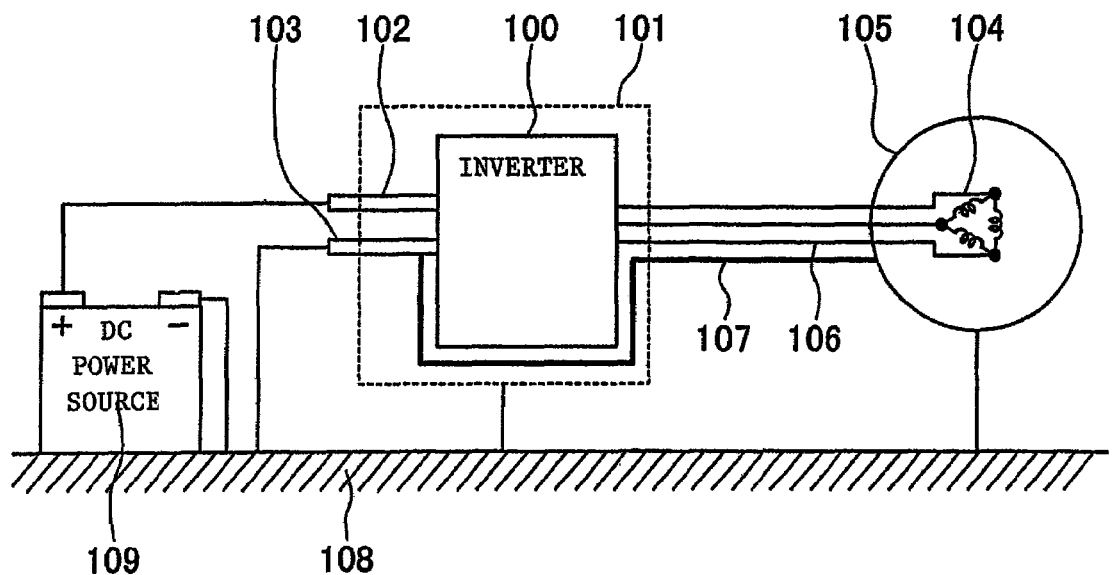
FIG. 1 is a schematic view showing a first embodiment of the present invention.
Figure 2:
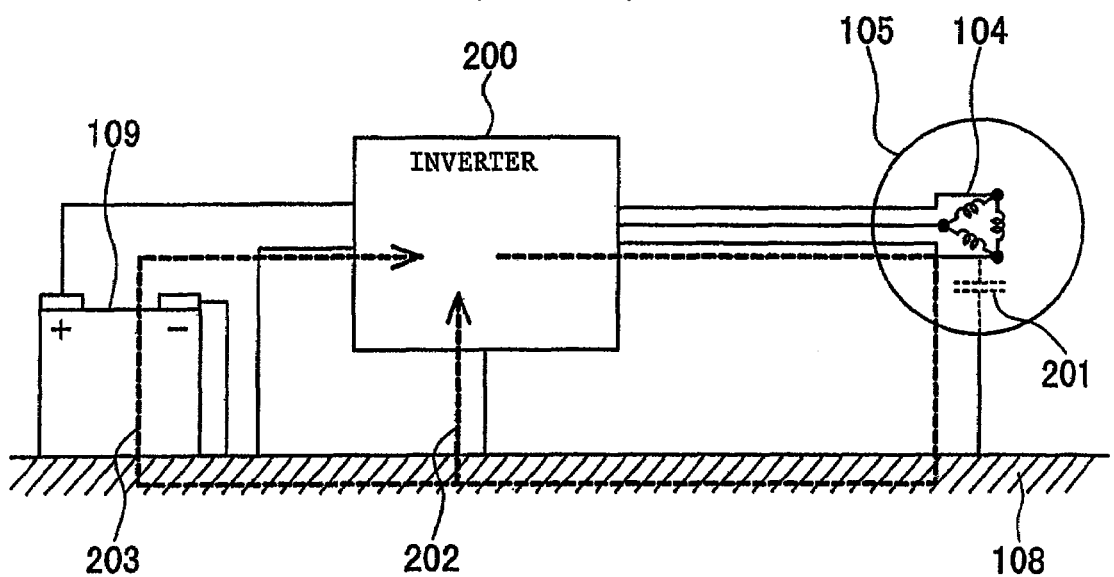
FIG. 2 is a reference view showing paths through which a typical common mode current flows in a brushless motor taking no measures against noise.

FIG. 1 shows a first embodiment of the present invention. A brushless motor system of the first embodiment comprises mainly a brushless motor, an inverter, and a direct current (DC) power source.

The inverter is constituted by an inverter circuit 100 contained in a metal housing 101. The metal housing 101 of the inverter is directly contacted with a ground 108 or electrically connected to the ground 108 through a conductor, such as a fixing member.

The brushless motor is constituted by a stator and a rotor both contained in a metal housing 105 of the motor. A current is supplied to each wire (motor winding 104) wound over the stator, to thereby generate a rotating magnetic field. The metal housing 105 of the motor is directly contacted with the ground 108 or electrically connected to the ground 108 through a conductor, such as a fixing member.

The motor windings 104 and the inverter circuit 100 are connected to each other by motor power lines 106. Also, a positive terminal of the DC power source 109 is connected to a P wiring 102 of the inverter, and a negative terminal of the DC power source 109 is connected to the ground 108.

Between the brushless motor and the inverter, a noise return line 107 is arranged so as to extend along the motor power lines 106. One end of the noise return line 107 is connected to the metal housing 105 of the motor, and the other end of the noise return line 107 is connected to an N wiring 103 of the inverter. With the provision of the noise return line 107, a part of a noise current having reached the metal housing 105 of the motor from the motor windings 104 through stray capacitance is returned to the inverter circuit 100 through the noise return line 107. Accordingly, a common mode current leaking to the ground 108 is reduced, whereby an electromagnetic noise trouble caused by the common mode current is lessened.

By employing the brushless motor system of this first embodiment, as described above, the noise current having generated in the inverter circuit 100 and reached the metal housing 105 of the motor is returned to the inverter circuit 100 through the noise return line 107. Hence the common mode current leaking from the motor to the ground is reduced. According to this first embodiment, therefore, adverse influences caused by electromagnetic noise, such as radio noise and malfunction, can be suppressed in the brushless motor system driven by the DC power source.

Second Embodiment

Figure 3:
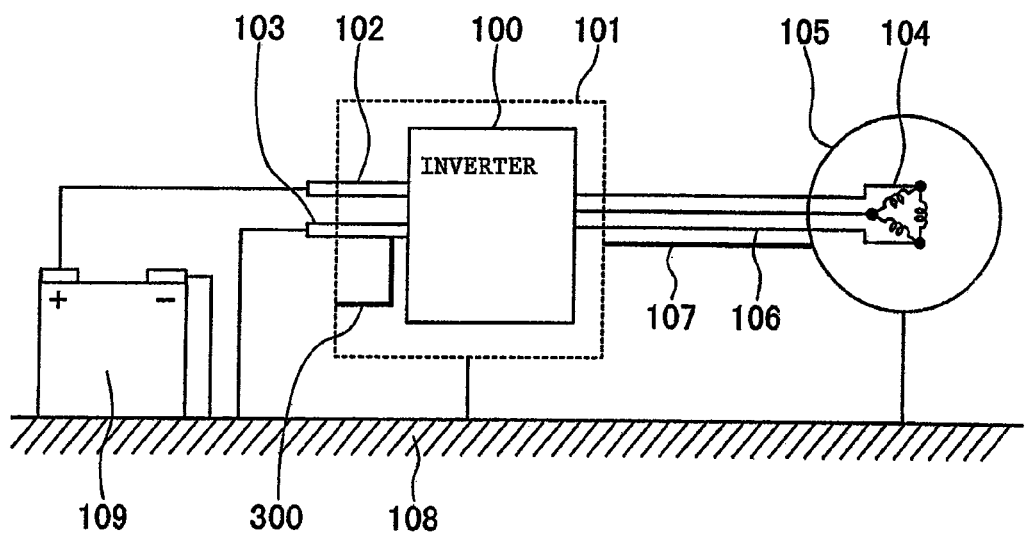
FIG. 3 is a schematic view showing a second embodiment of the present invention.

FIG. 3 shows a second embodiment of the present invention. This second embodiment is a modification of the above-described first embodiment, and the same components as those in the first embodiment are not described here.

In this second embodiment, one end of the noise return line 107 is connected to the metal housing 105 of the motor, and the other end of the noise return line 107 is connected to the metal housing 101 of the inverter. Further, the metal housing 101 of the inverter is connected to the N wiring 103 through a conductor 300. As an alternative, the N wiring 103 may be directly screwed to the metal housing 101 of the inverter in some cases without using the conductor 300. In this second embodiment, the noise current having returned from the motor side to the inverter side through the noise return line 107 reaches the N wiring 103 through the metal housing 101 of the inverter and the conductor 300, followed by returning to the inverter circuit 100.

Thus, according to this second embodiment, although the noise return line differs to some extent, the common mode current can be reduced and the electromagnetic noise trouble can be lessened as in the first embodiment.

Third Embodiment

Figure 4A:
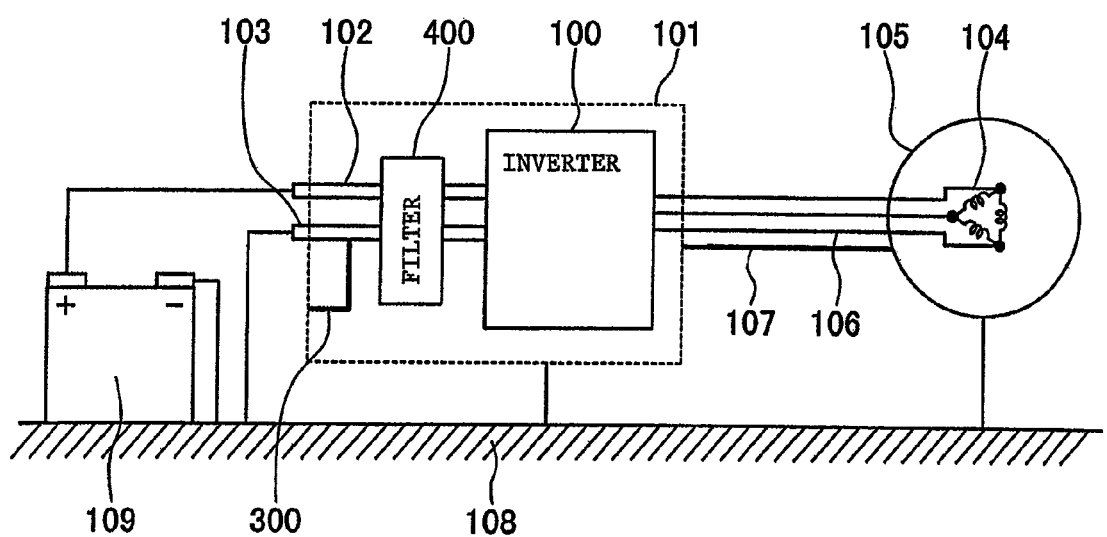
FIG. 4A is a schematic view showing a third embodiment of the present invention.

FIG. 4A shows a third embodiment of the present invention. This third embodiment is a modification of the above-described second embodiment, and the same components as those in the second embodiment are not described here.

In this third embodiment, a filter circuit 400 is disposed on the power source side of the inverter circuit 100. The metal housing 101 of the inverter is connected to the N wiring 103 on the power source side of the filter circuit 400 through a conductor 300. As an alternative, the N wiring 103 may be directly screwed to the metal housing 101 of the inverter without using the conductor 300.

Since this third embodiment can provide dual effects of reducing the noise current by the filter circuit 400 and returning the noise current by the noise return line 107, the generation of the common mode current can be further suppressed.

In addition, because of the combined use of both the noise return line 107 and the filter circuit 400, even when the noise current is generated in large amount, the electromagnetic noise trouble can be satisfactorily lessened by using the filter circuit 400 having a relatively small size.

Thus, according to the brushless motor system of this third embodiment, the adverse influences caused by the electromagnetic noise can be efficiently suppressed.

Fourth Embodiment

Figure 4B:
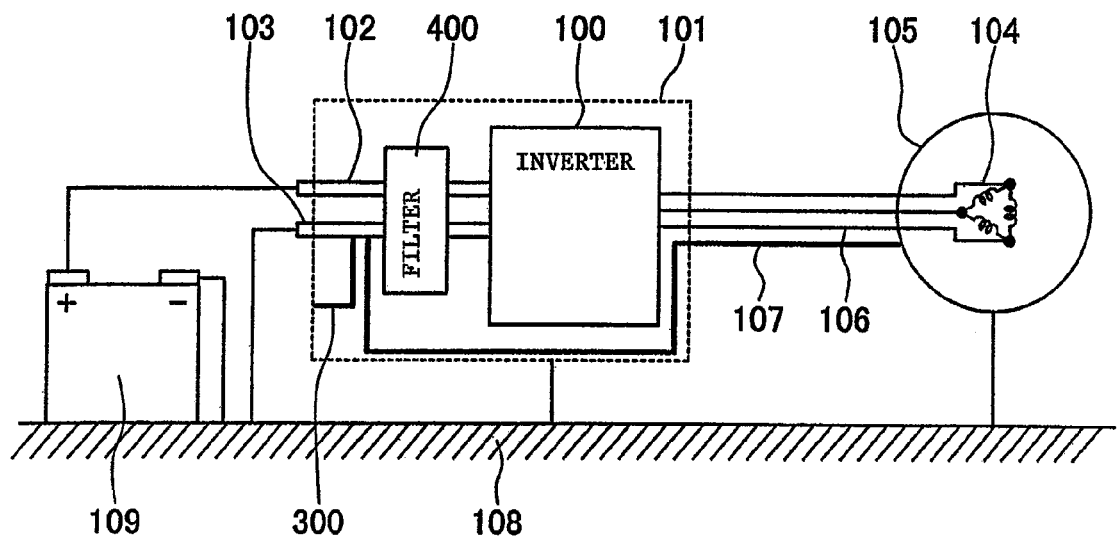
FIG. 4B is a schematic view showing a fourth embodiment of the present invention.

FIG. 4B shows a fourth embodiment of the present invention. This fourth embodiment is a modification of the above-described third embodiment, and the same components as those in the third embodiment are not described here.

In this fourth embodiment, one end of the noise return line 107 is connected to the metal housing 105 of the motor, and the other end of the noise return line 107 is connected to the N wiring 103 on the power source side of the filter circuit 400. Stated another way, the noise return line 107 in this fourth embodiment is directly connected to the N wiring 103 while bypassing the metal housing 101 of the inverter.

With the arrangement of this fourth embodiment, even when the impedance of the metal housing 101 of the inverter is relatively high, or even when the metal housing 101 of the inverter has a structure not allowing the connection of the noise return line 107 to it, the adverse influences caused by the electromagnetic noise can be efficiently suppressed.

Fifth Embodiment

Figure 4C:
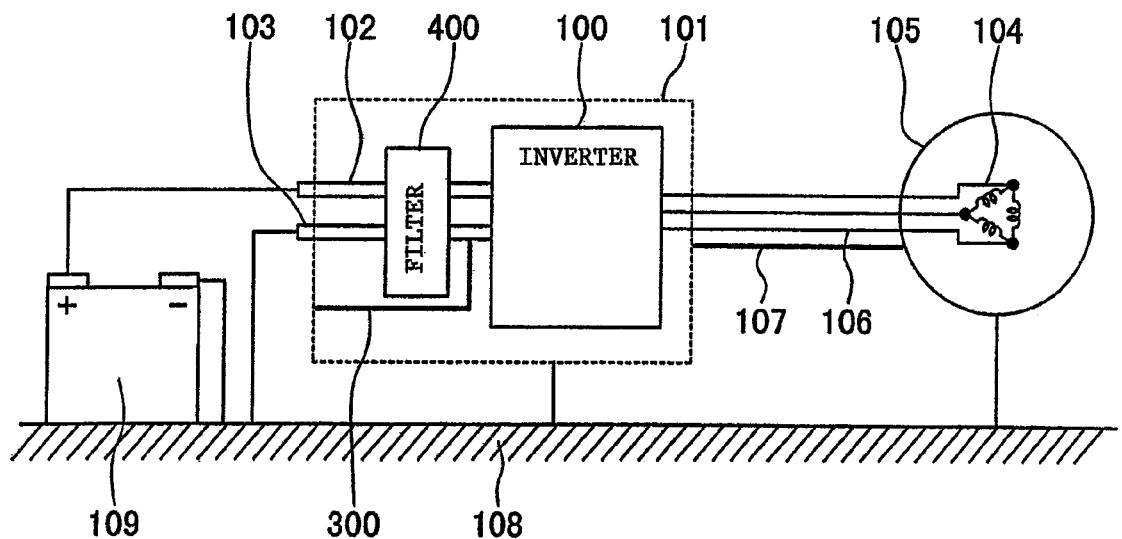
FIG. 4C is a schematic view showing a fifth embodiment of the present invention.

FIG. 4C shows a fifth embodiment of the present invention. This fifth embodiment is a modification of the above-described third embodiment, and the same components as those in the third embodiment are not described here.

In this fifth embodiment, as in the third embodiment, the metal housing 101 of the inverter is connected to the N wiring 103 through a conductor 300. However, a part of the N wiring 103 to which is connected the metal housing 101 of the inverter is present between the filter circuit 400 and the inverter circuit 100. As an alternative, that part of the N wiring 103 may be directly screwed to the metal housing 101 of the inverter without using the conductor 300.

According to this fifth embodiment, in some internal structure of the inverter, the adverse influences caused by the electromagnetic noise can be more efficiently suppressed than the case of connecting the metal housing 101 of the inverter to a part of the N wiring 103 between the DC power source 109 and the filter circuit 400 as in the third embodiment.

Sixth Embodiment

Figure 4D:
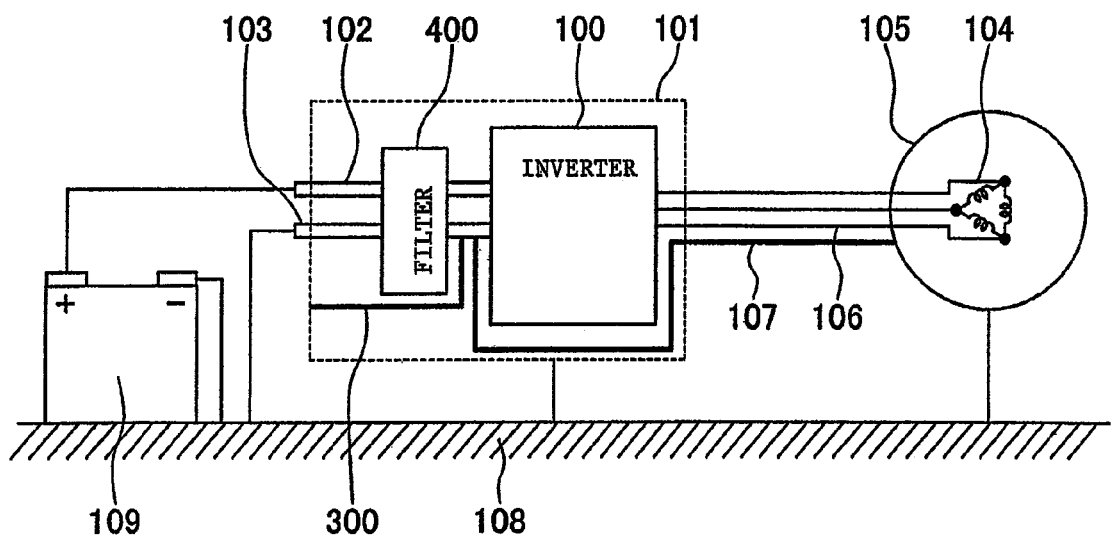
FIG. 4D is a schematic view showing a sixth embodiment of the present invention.

FIG. 4D shows a sixth embodiment of the present invention. This sixth embodiment is a modification of the above-described fifth embodiment, and the same components as those in the fifth embodiment are not described here.

In this sixth embodiment, one end of the noise return line 107 is connected to the metal housing 105 of the motor, and the other end of the noise return line 107 is connected to a part of the N wiring 103 between the filter circuit 400 and the inverter circuit 100. Stated another way, the noise return line 107 is directly connected to the N wiring 103 while bypassing the metal housing 101 of the inverter.

Thus, according to this sixth embodiment, even when the impedance of the metal housing 101 of the inverter is relatively high, or even when the metal housing 101 of the inverter has a structure not allowing easy connection of the noise return line 107 to it, the adverse influences caused by the electromagnetic noise can be efficiently suppressed.

Seventh Embodiment

Figure 4E:
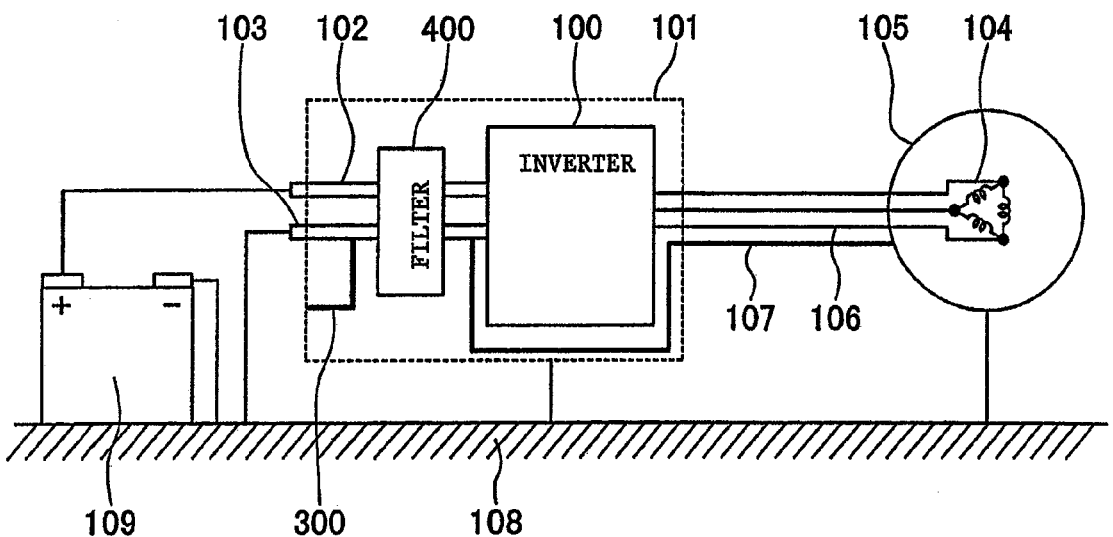
FIG. 4E is a schematic view showing a seventh embodiment of the present invention.

FIG. 4E shows a seventh embodiment of the present invention. This seventh embodiment is a modification of the above-described fourth and sixth embodiments, and the same components as those in the fourth and sixth embodiments are not described here.

In this seventh embodiment, the metal housing 101 of the inverter is connected to the N wiring 103 on the power source side of the filter circuit 400 through a conductor 300. As an alternative, the N wiring 103 may be directly screwed to the metal housing 101 of the inverter without using the conductor 300. Further, one end of the noise return line 107 is connected to the metal housing 105 of the motor, and the other end of the noise return line 107 is connected to a part of the N wiring 103 between the filter circuit 400 and the inverter circuit 100.

The noise return path in this seventh embodiment is formed such that noise generated from the metal housing 105 of the motor is returned to the inverter circuit 100 through the noise return line 107. Because of not passing through the filter circuit 400, such a noise return path has low impedance. On the other hand, the path returned to the inverter circuit 100 from the conductor 300 and the DC power source 109 passes through the filter circuit 400 and therefore has high impedance.

Thus, according to this seventh embodiment, the noise current is allowed to flow in larger amount through the noise return line 107, and the common mode current can be further reduced.

Eighth Embodiment

Figure 5A:
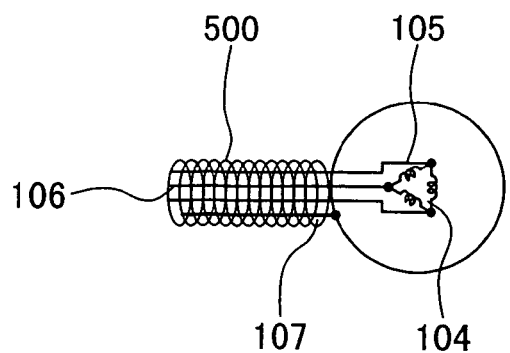
FIG. 5A is a schematic view showing an eighth embodiment of the present invention.
Figure 5B:
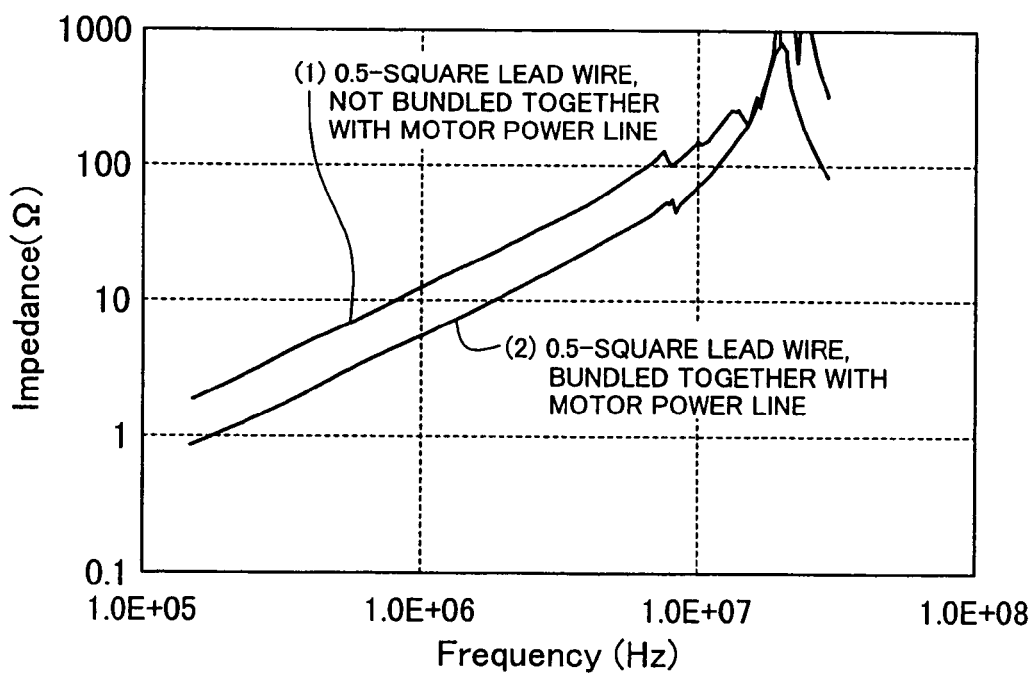
FIG. 5B is a graph showing the result of measuring the impedance of a noise return path in the eighth embodiment of the present invention.

FIGS. 5A and 5B show an eighth embodiment of the present invention. This eighth embodiment is concerned with a detailed structure of the noise return line and the motor power lines.

As shown in FIG. 5A, a conductive lead wire is used as the noise return line 107. One end of the noise return line 107 is connected to the metal housing 105 of the motor, and the noise return line 107 is bundled together with the three motor power lines 106 by using a binding material 500, such as a vinyl tape or a spiral tube.

The noise current flows in opposed directions between the motor power lines 106 and the noise return line 107. By arranging those lines close to each other, therefore, magnetic fields formed by the currents flowing through those lines in the opposed directions are cancelled off, thus resulting in an effect of reducing the inductance of each line. In other words, the impedance of the noise return line is reduced and the noise current is more easily passed through the noise return line 107. As a result, the common mode current leaking to the ground is reduced and the electromagnetic noise is also reduced.

FIG. 5B is a graph showing the result of measuring the impedance of the noise return path when a lead wire having a cross-sectional area of 0.5 square mm is used as the noise return line 107 and is bundled or not bundled together with the motor power lines 106. In the measurement, however, the motor is not connected and one end of each motor power line on the motor side is short-circuited to one end of the noise return line on the motor side.

As seen from FIG. 5B, when frequency is not higher than 10 MHz, the impedance in the case (2) of the noise return line being bundled together with the motor power lines is apparently lower than that in the case (1) of the noise return line being not bundled together with the motor power lines. Thus, by bundling the motor power lines 106 and the noise return line 107 together as in this eighth embodiment, the noise current can be made more easily passed through the noise return line.

Bundling the noise return line together with the motor power lines contributes to not only reducing the impedance as described above, but also to making smaller a loop area of the noise return path. Generally, the intensity of an electromagnetic wave radiated from a current loop is in proportion to an area defined by the current loop. Therefore, the smaller the area of the current loop, the weaker is the intensity of the radiated electromagnetic wave.

According to this eighth embodiment, since the noise return line is bundled together with the motor power lines, the loop area of the noise return path can be reduced and the radiation noise can also be reduced.

Ninth Embodiment

Figure 5C:
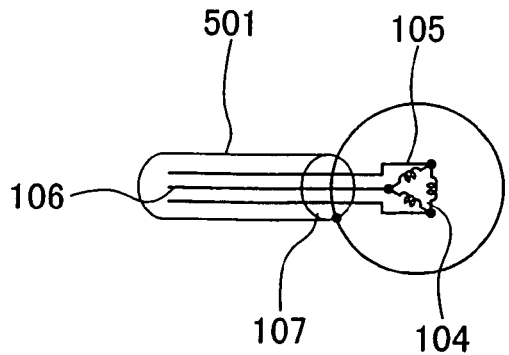
FIG. 5C is a schematic view showing a ninth embodiment of the present invention.

FIG. 5C shows a ninth embodiment of the present invention. In this ninth embodiment, as shown in FIG. 5C, the motor power lines 106 are extended through a braided wire 501, and the braided wire 501 is utilized as the noise return path. One end of the braided wire 501 is connected to the metal housing 105 of the motor, and the other end of braided wire 501 is connected to the metal housing 101 of the inverter.

While the noise return line 107 is bundled together with the motor power lines 106 in the above-described eighth embodiment, this ninth embodiment can provide similar advantages to those in the eighth embodiment without bundling the noise return line 107 together with the motor power lines 106.

Tenth Embodiment

While the eighth embodiment has been described as bundling one noise return line 107 together with the motor power lines 106, it is possible to further reduce the impedance of the noise return path and increase the returned noise current by providing a plurality of noise return lines 107.

Figure 6A:
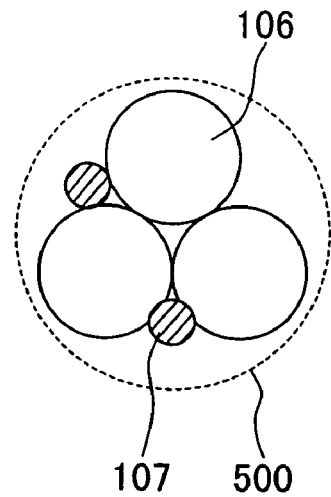
FIGS. 6A and 6B are schematic views showing a tenth embodiment of the present invention.
Figure 6B:
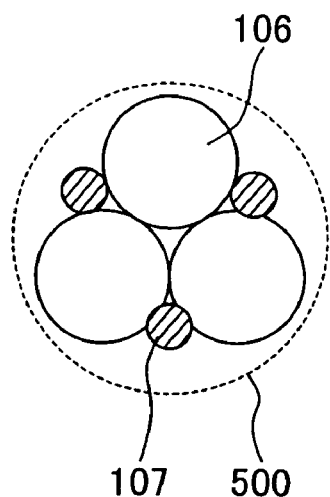
Figure 6C:
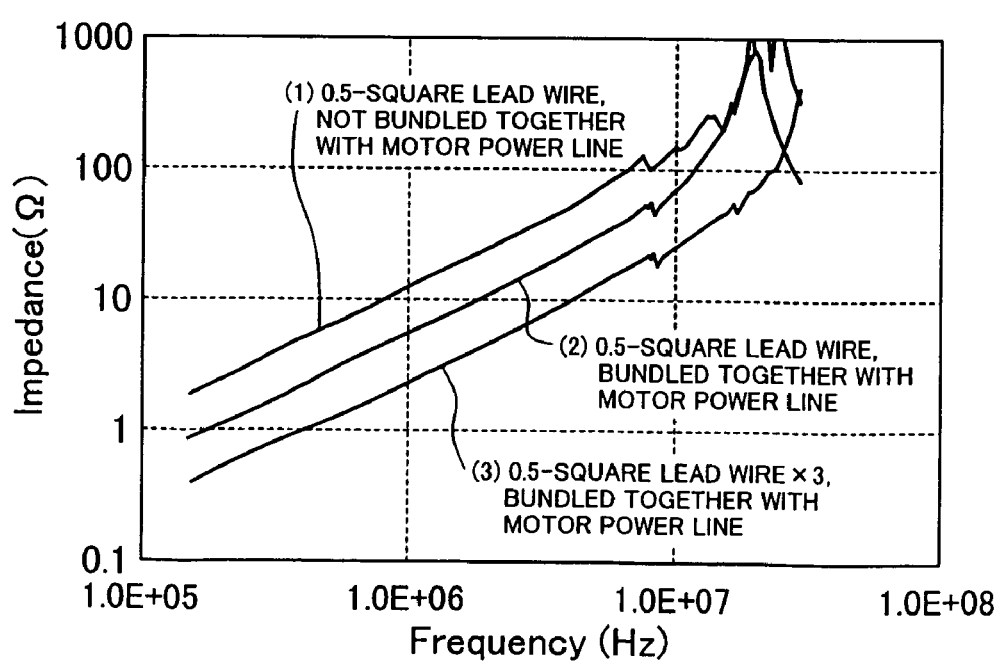
FIG. 6C is a graph showing the result of measuring the impedance of a noise return path in the tenth embodiment of the present invention.

FIGS. 6A-6C show a tenth embodiment of the present invention. In this tenth embodiment, a plurality of noise return lines 107 are disposed in gaps between the three motor power lines 106 in such an arrangement that the noise return lines are uniformly distributed and are positioned close to the motor power lines. In the case of using two noise return lines, for example, the noise return lines 107 and the motor power lines 106 are bundled together to have a cross-sectional structure shown in FIG. 6A. Also, in the case of using three noise return lines, they are arranged to have a cross-sectional structure shown in FIG. 6B.

FIG. 6C is a graph showing the result of measuring the impedance of the noise return path when three lead wires each having a cross-sectional area of 0.5 square are used as the noise return lines 107 and are bundled together with the motor power lines 106 by using a spiral tube to have the cross-sectional structure shown in FIG. 6B. In the measurement, however, the motor is not connected and one ends of the motor power lines on the motor side are short-circuited to one ends of the noise return lines on the motor side. Additionally, the results shown in FIG. 5B are also shown in FIG. 6C for the purpose of comparison.

As seen from the result of FIG. 6C, the impedance of the noise return lines of this embodiment, represented by (3), is even lower than that in the case, represented by (2), where one lead wire is bundled together with the motor power lines. The reason is that current concentration is mitigated with the provision of the plurality of noise return lines and inductances are more effectively canceled off between the motor power lines and the noise return lines with the evenly distributed arrangement shown in FIG. 6B.

Figure 6D:
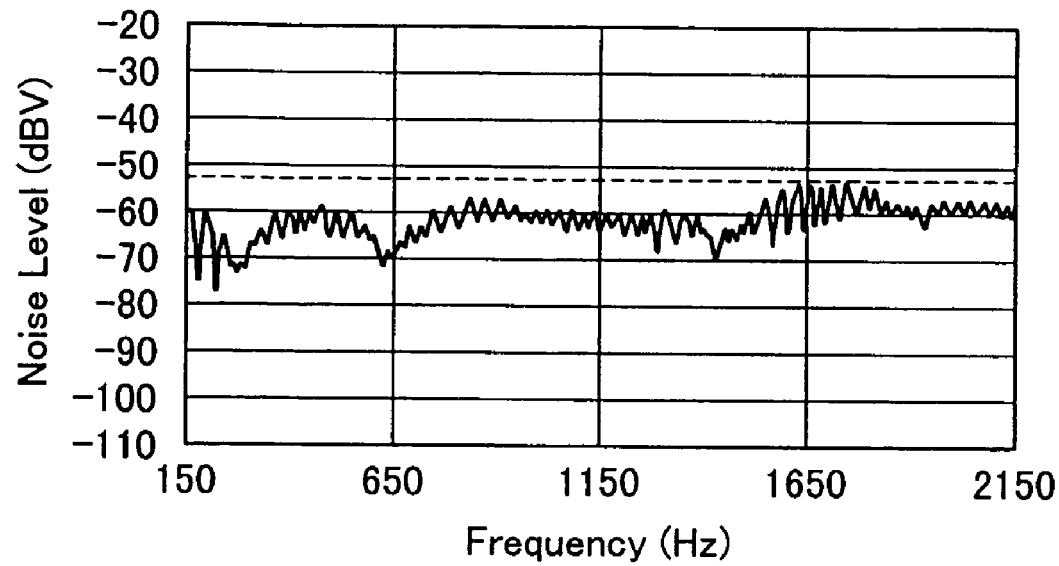
FIGS. 6D and 6E are graphs showing the results of measuring a level of conduction noise in the case of not using any noise return path and in the tenth embodiment of the present invention, respectively.
Figure 6E:
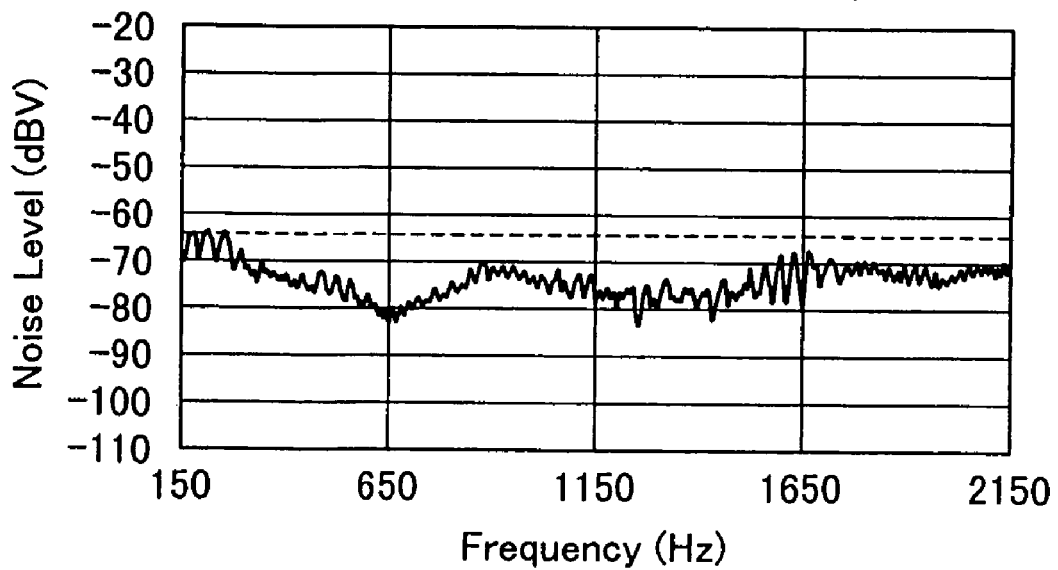

FIGS. 6D and 6E are graphs showing conduction noise spectra measured in the AM band when no noise return lines are used and when the noise return lines according to the tenth embodiment are used, respectively. Those graphs are obtained by actually measuring the noise current leaked from the motor to the ground in the brushless motor system by using a current probe and a spectrum analyzer.

Similarly to the case (3) in FIG. 6C, three lead wires each having a cross-sectional area of 0.5 square are used as the noise return lines and are bundled together with the motor power lines 106 by using a spiral tube to have the cross-sectional structure shown in FIG. 6B. As seen from FIGS. 6D and 6E, when no noise return lines are used, the noise level is as high as −53 dBV. On the other hand, when the noise return lines according to the tenth embodiment are used, the noise level is held to be not higher than −65 dBV.

Eleventh Embodiment

Figure 7A:
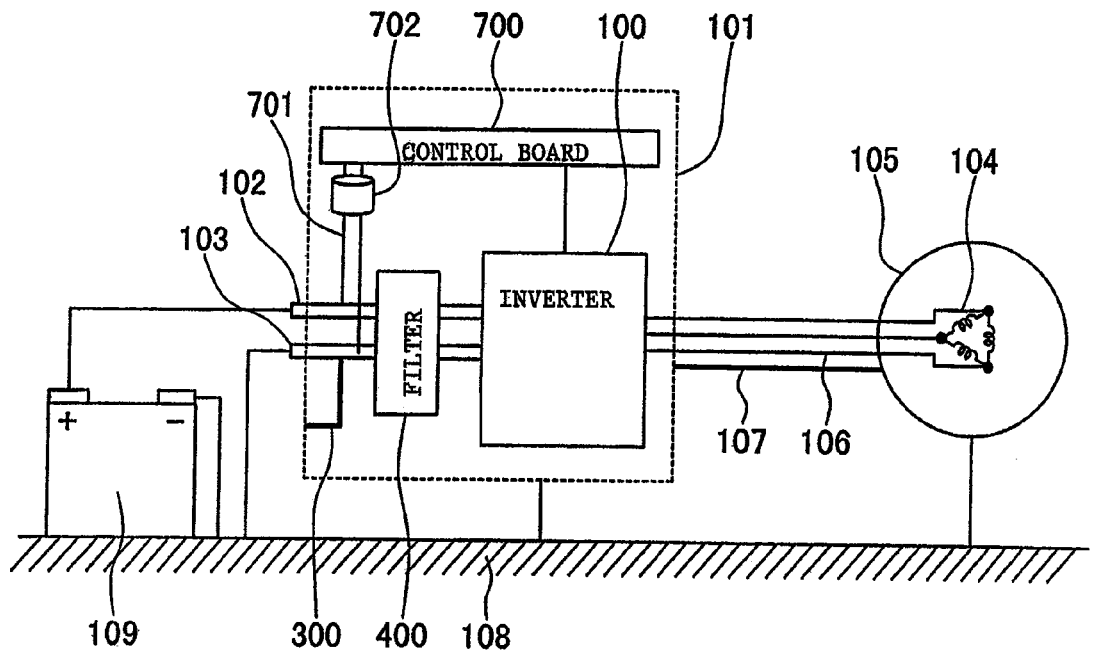
FIGS. 7A and 7B are schematic views showing an eleventh embodiment of the present invention.

FIG. 7A shows an eleventh embodiment of the present invention. In an ordinary inverter, a control board 700 for controlling the inverter circuit 100 is mounted to the metal housing 101 of the inverter. This eleventh embodiment is intended to reduce the noise current flowing through the control board 700.

Figure 7B:
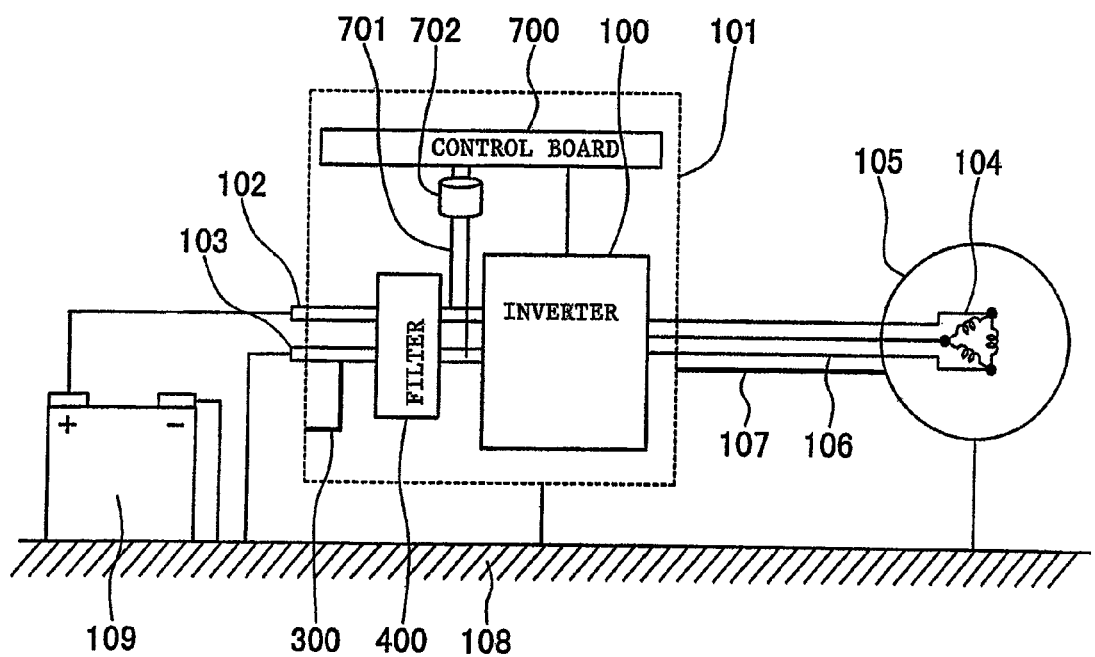

In FIG. 7A, the control board 700 is connected to the inverter circuit 100 in the same arrangement as that of the third embodiment. More specifically, in this eleventh embodiment, power source lead-out lines 701 of the control board 700 are connected to the power-source side wirings of the filter circuit 400. The connection of the power source lead-out lines 701 may be modified, as shown in FIG. 7B, such that the lines 701 are connected to respective parts of the wirings between the filter circuit 400 and the inverter circuit 100.

A common mode choke coil 702 is mounted to the power source lead-out lines 701 or a power source wiring on the control board 700, which is connected to the lines 701. With the connection of the power source lead-out lines 701 and the addition of the common mode choke coil 702, the common mode current can be suppressed from flowing through the control board 700, whereby the electromagnetic noise can be reduced.

The embodiments of the present invention have been described in detail above, but the present invention is not limited to those embodiments and can be modified in various ways without departing the scope of technical conception of the invention. For example, while the tenth embodiment has been described as providing two or three noise return lines, as the plurality of noise return lines, in the evenly distributed arrangement, it is a matter of course that a modification including four or more noise return lines falls within the scope of the present invention. Also, the brushless motor system may be modified within the scope of the present invention such that a part of the plurality of noise return lines is connected to the metal housing 101 of the inverter, and the remaining part is connected to the N wiring 103 of the inverter.

What is claimed is:
1. A brushless motor system, comprising:
a brushless motor having a stator that includes motor windings, and a rotor, wherein a first metal housing is associated with said rotor and stator; and an inverter including an inverter circuit inside a second metal housing, for driving said brushless motor through three motor power lines connected to said motor windings; wherein said first metal housing and said second metal housing are electrically connected to ground;

said inverter has i) a first wiring for receiving electric power from a first terminal of a direct current power source which has a second terminal electrically connected to ground, and ii) a second wiring that is electrically connected to a ground, for connection to said second terminal of said direct current power source via ground; and a noise return line for returning a noise current is connected between said brushless motor and said inverter, independently of the electrical connection of said first and second metal housings to ground.

2. The brushless motor system according to claim 1, wherein said noise return line is electrically connected between the first metal housing that is associated with said rotor and stator of said brushless motor and the second wiring of said inverter.

3. The brushless motor system according to claim 1, wherein: said inverter has a conductor for electrically connecting the second metal housing and the second wiring to each other; and said noise return line is electrically connected between the first metal housing that is associated with said rotor and stator of said brushless motor and the second wiring of said inverter.

4. The brushless motor system according to claim 1, wherein:

a filter circuit having a passive device is operatively arranged between the second wiring and said inverter; and said conductor is electrically connected between the second wiring and the second metal housing.

5. The brushless motor system according to claim 2, wherein:

said inverter has a conductor for electrically connecting the second metal housing and the second wiring to each other;

a filter circuit including a passive device is operatively arranged between the second winding and said inverter;

said conductor is electrically connected between a part of the second wiring, which is positioned in an input section of said filter circuit, and the second metal housing; and said noise return line is electrically connected between the second wiring and the first metal housing.

6. The brushless motor system according to claim 3, wherein:

said filter circuit including a passive device is provided in an input section of said inverter; and said conductor is electrically connected between said filter circuit and the inverter.

7. The brushless motor system according to claim 4, wherein:

said inverter has a control board for controlling said inverter circuit;

said control board is connected with power source lead-out lines extended from parts of the first wiring and the second wiring on the input side of said filter circuit; and a common mode choke coil is mounted to said power source lead-out lines or a wiring on said control board, which is electrically connected to said power source lead-out lines.

8. The brushless motor system according to claim 4, wherein:

said inverter has a control board for controlling said inverter circuit;

said control board is connected with power source lead-out lines extended from parts of the first wiring and the second wiring on the output side of said filter circuit; and a common mode choke coil is mounted to said power source lead-out lines or a wiring on said control board, which is electrically connected to said power source lead-out lines.

9. The brushless motor system according to claim 1, wherein said noise return line is arranged proximate said motor power line.

10. The brushless motor system, comprising:

a brushless motor enclosed by a first metal housing that is electrically connected to ground;

an inverter that is electrically coupled to drive said brushless motor, and includes an inverter circuit enclosed by a second metal housing that is electrically connected to ground; and a noise return line that is electrically connected between said first metal housing and said inverter, independently of said ground, and independently of said electrical connection of said first and second metal housings to ground, for returning a noise current to said inverter.

11. A brushless motor system according to claim 10, wherein said first metal housing comprises a metal housing of said motor.

12. A brushless motor system according to claim 10, wherein said inverter has input connections for receiving electrical power from a direct current power source having a first terminal for outputting power to said inverter and a second terminal that is connected to ground, wherein said input connections comprise:

a first wiring for connection to said first terminal; and a second wiring for connection to ground, and to said second terminal via ground.

13. The brushless motor system according to claim 12, wherein said noise return line is electrically connected between said first metal housing and said second wiring.

14. The brushless motor system according to claim 13, further comprising at least one electrical filter connected in said first and second wirings.

15. The brushless motor system according to claim 14, wherein said at least one filter is positioned between a connection point of said noise return line to said second wiring and said inverter circuit.

16. The brushless motor system of claim 12, wherein said return line is electrically coupled to said second metal housing.

17. The brushless motor system according to claim 10, wherein:

said noise return line passes through the second metal housing from an exterior thereof, into an interior thereof; and said noise return line is electrically connected to an input of the inverter in the interior of the second metal housing.

18. The brushless motor system according to claim 17, wherein said ground to which said second metal housing is connected includes a connection for connecting to a second terminal of a direct current power source arranged outside of the second metal housing.

19. The brushless motor system according to claim 10, wherein:

the inverter comprises an inverter circuit; and the brushless motor system further comprises an electrical filter connected between a connection point of said noise return line to the input of the inverter and said inverter circuit.

20. A brushless motor system, comprising:
a brushless motor having a stator that includes motor windings, and a rotor, wherein a first metal housing is associated with said rotor and stator; and
an inverter including an inverter circuit inside a second metal housing, for driving said brushless motor through three motor power lines connected to said motor windings; wherein,
said first metal housing and said second metal housing are electrically connected to ground;
said inverter has i) a first wiring for receiving electric power from a first terminal of a direct current power source which has a second terminal electrically connected to ground, and ii) a second wiring that is electrically connected to a ground, for connection to said second terminal of said direct current power source via ground;
a noise return line for returning a noise current is connected between said brushless motor and said inverter, independently of the electrical connection of said first and second metal housings to ground;
a filter being provided between a second wiring and said inverter; and
one end of said noise return line which is located at the side of said inverter is connected to the side of the second terminal rather than said filter.

21. The brushless motor system according to claim 20, wherein said noise return line is electrically connected between the first metal housing that is associated with said rotor and stator of said brushless motor and the second wiring of said inverter.

22. The brushless motor system according to claim 20, wherein:
said inverter has a conductor for electrically connecting the second metal housing and the second wiring to each other; and
said noise return line is electrically connected between the first metal housing that is associated with said rotor and stator of said brushless motor and the second wiring of said inverter.

23. The brushless motor system according to claim 20, wherein said noise return line is arranged proximate said motor power line.

24. A brushless motor system, comprising:
a brushless motor having a stator that includes motor windings, and a rotor, wherein a first metal housing is associated with said rotor and stator; and
an inverter including an inverter circuit inside a second metal housing, for driving said brushless motor through three motor power lines connected to said motor windings; wherein,
said first metal housing and said second metal housing are electrically connected to ground;
said inverter has i) a first wiring for receiving electric power from a first terminal of a direct current power source which has a second terminal electrically connected to ground, and ii) a second wiring that is electrically connected to a ground, for connection to said second terminal of said direct current power source via ground;
a noise return line for returning a noise current is connected between said brushless motor and said inverter, independently of the electrical connection of said first and second metal housings to ground;
a filter being provided between a second wiring and said inverter; and
one end of said noise return line which is located at the side of said inverter is connected to the side of said inverter rather than said filter.

25. The brushless motor system according to claim 24, wherein said noise return line is electrically connected between the first metal housing that is associated with said rotor and stator of said brushless motor and the second wiring of said inverter.

26. The brushless motor system according to claim 24, wherein:
said inverter has a conductor for electrically connecting the second metal housing and the second wiring to each other; and
said noise return line is electrically connected between the first metal housing that is associated with said rotor and stator of said brushless motor and the second wiring of said inverter.

27. The brushless motor system according to claim 24, wherein said noise return line is arranged proximate said motor power line.

28. A brushless motor system, comprising:
a brushless motor enclosed by a first metal housing that is electrically connected to ground;
an inverter that is electrically coupled to drive said brushless motor, and includes an inverter circuit enclosed by a second metal housing that is electrically connected to ground;
a noise return line that is electrically connected between said first metal housing and said inverter, independently of said ground, and independently of said electrical connection of said first and second metal housings to ground, for returning a noise current to said inverter; and
said first metal housing and said second metal housing are connected to ground independently.

29. The brushless motor system according to claim 28, wherein said noise return line is electrically connected between the first metal housing that is associated with said rotor and stator of said brushless motor and the second wiring of said inverter.

30. The brushless motor system according to claim 28, wherein:
said inverter has a conductor for electrically connecting the second metal housing and the second wiring to each other; and
said noise return line is electrically connected between the first metal housing that is associated with said rotor and stator of said brushless motor and the second wiring of said inverter.

31. The brushless motor system according to claim 28, wherein:
a filter circuit having a passive device is operatively arranged between the second wiring and said inverter; and
said conductor is electrically connected between the second wiring and the second metal housing.

32. The brushless motor system according to claim 28, wherein said noise return line is arranged proximate said motor power line.

33. A brushless motor system, comprising:
a brushless motor enclosed by a first metal housing that is electrically connected to ground;
an inverter that is electrically coupled to drive said brushless motor, and includes an inverter circuit enclosed by a second metal housing that is electrically connected to ground;

a noise return line that is electrically connected between said first metal housing and said inverter, independently of said ground, and independently of said electrical connection of said first and second metal housings to ground, for returning a noise current to said inverter;

said noise return line is inserted into said second metal housing, and is connected to the input side of said inverter.

34. The brushless motor system according to claim 33, wherein said noise return line is electrically connected between the first metal housing that is associated with said rotor and stator of said brushless motor and the second wiring of said inverter.

35. The brushless motor system according to claim 33, wherein:

said inverter has a conductor for electrically connecting the second metal housing and the second wiring to each other; and said noise return line is electrically connected between the first metal housing that is associated with said rotor and stator of said brushless motor and the second wiring of said inverter.

36. The brushless motor system according to claim 33, wherein:

a filter circuit having a passive device is operatively arranged between the second wiring and said inverter; and said conductor is electrically connected between the second wiring and the second metal housing.

37. The brushless motor system according to claim 20, wherein said noise return line is arranged proximate said motor power line.

* * * * *